(12) United States Patent
Fischer

(10) Patent No.: US 8,556,482 B2
(45) Date of Patent: Oct. 15, 2013

(54) METHOD FOR PRODUCING A HEADLAMP LENS FOR A MOTOR-VEHICLE HEADLAMP

(75) Inventor: Jens Fischer, Schleiz (DE)

(73) Assignee: Docter Optics SE (DE)

( * ) Notice: Subject to any disclaimer, the term of this patent is extended or adjusted under 35 U.S.C. 154(b) by 808 days.

(21) Appl. No.: 12/669,689

(22) PCT Filed: May 16, 2008

(86) PCT No.: PCT/DE2008/000844
§ 371 (c)(1),
(2), (4) Date: Jan. 19, 2010

(87) PCT Pub. No.: WO2009/012736
PCT Pub. Date: Jan. 29, 2009

(65) Prior Publication Data
US 2010/0172146 A1      Jul. 8, 2010

(30) Foreign Application Priority Data

Jul. 26, 2007  (DE) .......... 10 2007 035 025
Oct. 18, 2007  (DE) .......... 10 2007 049 835

(51) Int. Cl.
*B60Q 1/00* (2006.01)
(52) U.S. Cl.
USPC ........... 362/539; 362/317; 362/335; 362/336; 362/338; 362/459; 362/475; 362/507; 362/520; 362/521; 362/523; 362/538
(58) Field of Classification Search
USPC ......... 362/475, 507, 520, 538, 317, 335, 336, 362/338, 459, 521, 523, 539
See application file for complete search history.

(56) References Cited

U.S. PATENT DOCUMENTS

| | | | | |
|---|---|---|---|---|
| 4,249,232 A | * | 2/1981 | Dick | 362/547 |
| 4,288,861 A | * | 9/1981 | Swainson et al. | 365/127 |
| 5,426,500 A | | 6/1995 | Ohana | |
| 5,917,105 A | * | 6/1999 | Xu et al. | 65/37 |

(Continued)

FOREIGN PATENT DOCUMENTS

| | | |
|---|---|---|
| DE | 1099964 | 8/1961 |
| DE | 4031352 A1 | 4/1992 |

(Continued)

OTHER PUBLICATIONS

PCT International Search Report for PCT/DE2008/000844 completed by the EP Searching Authority on Oct. 8, 2008.

(Continued)

*Primary Examiner* — Robert May
*Assistant Examiner* — Tsion Tumebo
(74) *Attorney, Agent, or Firm* — Barnes & Thornburg LLP

(57) ABSTRACT

The invention relates to a method for producing a headlamp lens (2) for a vehicle headlamp, in particular for a motor-vehicle headlamp (1), wherein the headlamp lens (2) comprises a transparent body (3) with an optically effective surface (5), which is in particular substantially planar and can be turned towards a light source (10), and an optically effective surface (4), which is in particular convex and can be turned away from the light source (10), wherein the gradient of a light-dark boundary (25) projected by the headlamp lens (2) or a further headlamp lens is measured, and wherein a light diffusing structure (35) is produced in the transparent body (3) in accordance with the measured gradient.

18 Claims, 16 Drawing Sheets

(56) References Cited

U.S. PATENT DOCUMENTS

Figure 1:
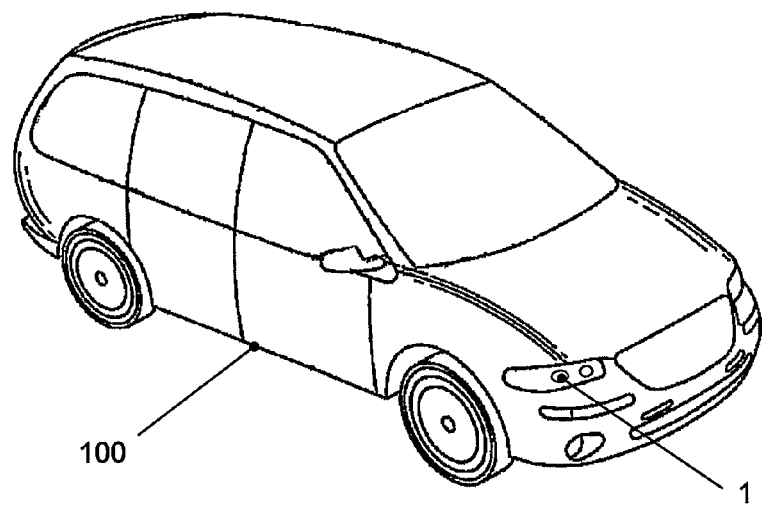

| | | | |
|---|---|---|---|
| 6,130,777 A | 10/2000 | Yamashita et al. | |
| 6,464,382 B1 * | 10/2002 | Duflos | 362/520 |
| 6,992,804 B2 * | 1/2006 | Lamy et al. | 359/3 |
| 2001/0033726 A1 | 10/2001 | Shie et al. | |
| 2002/0093829 A1 | 7/2002 | Pinson et al. | |

FOREIGN PATENT DOCUMENTS

| | | |
|---|---|---|
| DE | 3602262 C2 | 5/1995 |
| DE | 4407547 C2 | 5/1996 |
| DE | 29912504 U1 | 10/1999 |
| DE | 29914114 U1 | 12/1999 |
| DE | 19829586 A1 | 1/2000 |
| DE | 10052653 A1 | 5/2002 |
| DE | 10118687 A1 | 10/2002 |
| DE | 10350266 A1 | 6/2005 |
| DE | 102005009556 A1 | 9/2005 |
| DE | 10226471 B4 | 3/2007 |
| EP | 0171646 A1 | 7/1985 |
| EP | 0584547 A1 | 7/1993 |
| EP | 0791911 A2 | 8/1997 |
| EP | 0272646 A1 | 5/1998 |
| EP | 1584863 A2 | 10/2005 |
| EP | 1645545 A1 | 4/2006 |
| EP | 1327168 | 8/2007 |
| EP | 01978513 | 10/2008 |
| FR | 2770617 B1 | 2/2000 |
| FR | 2815425 A1 | 4/2002 |
| JP | 01 147403 A | 6/1989 |
| JP | 09 159810 A | 6/1997 |
| JP | 10 123307 A | 5/1998 |
| RU | 1818307 A3 | 5/1993 |
| RU | 1838163 A3 | 8/1993 |
| RU | FR 2819040 A1 | 7/2002 |
| WO | WO 92/03297 | 3/1992 |
| WO | WO 0231543 A1 | 4/2002 |
| WO | WO 03074251 A1 | 9/2003 |

OTHER PUBLICATIONS

De.wikipedia.org/wiki/Glasinnengravur (2 pages).

Klaus Dickmann, Elena Dik, "Innenbearbeitung von Glas mit Nd: YAG-Laser", Laser Magazin, 1995, Seiten 16-19.

"Optical applications of laser-induced gratings in EU doped glasses" Applied Optics, von E.G. Behrens et al., vol. 29, No. 11, Apr. 10, 1990.

* cited by examiner

METHOD FOR PRODUCING A HEADLAMP LENS FOR A MOTOR-VEHICLE HEADLAMP

CROSS-REFERENCE TO RELATED APPLICATIONS

This application is a U.S. national counterpart application of international application serial No. PCT/DE2008/000844 filed May 16, 2008, which claims priority to German Patent Application No. 102007035025.4 filed on Jul. 26, 2007 and German Patent Application No. 102007049835.9 filed on Oct. 18, 2007.

The invention relates to a method for manufacturing a headlight lens for a vehicle headlight, in particular for a motor vehicle headlight, as well as to a vehicle headlight as such.

Headlight lenses are known e.g. from WO 02/31543 A1, U.S. Pat. No. 6,992,804 B2, WO 03/074251 A1 and DE 100 52 653 A1. Further vehicle headlights are known e.g. from DE 100 33 766 A1, EP 0 272 646 A1, DE 101 18 687 A1 and DE 198 29 586 A1.

DE 203 20 546 U1 discloses a lens bright-pressed/blank-moulded on both sides and having one curved surface, one planar surface and a holding or retaining edge moulded onto the lens edge, wherein a supporting edge of at least 0.2 mm thickness and protruding with respect to the planar surface is moulded to the retaining edge. Herein, the supporting edge is moulded to the outer circumference of the headlight lens. A further headlight lens having a supporting edge is disclosed e.g. by DE 10 2004 048 500 A1.

With respect to their optical properties or to photometric guidelines and standards, headlight lenses are subject to rather narrow criteria of design. This particularly applies with regard to a light-dark-borderline 25, as has been represented, by way of example, in FIG. 3 of a diagram 20 and in a photograph 21. In this context, the gradient G of the light-dark-borderline 25 and the glare value HV of the vehicle lens in which the headlight lens is mounted are important photometric standards.

It is the object of the invention to improve the photometric properties of vehicle headlights.

The aforementioned object is achieved by a method for manufacturing a headlight lens for a vehicle headlight, in particular for a motor vehicle headlight, wherein the headlight lens comprises a transparent body having an/one essentially planar optically operative surface to face a light source, and an/one in particular convexly curved optically operative surface to face away from the light source, wherein the gradient of a light-dark-borderline imaged by the headlight lens, or a further headlight lens is measured and wherein a light scattering structure is generated in the transparent body depending on the measured gradient. A gradient in the sense of the invention is, in particular, a gradient in the sense of Photometric Rule (Specification) FMVSS 118. The transparent body of the headlight lens is advantageously made of glass. However, it may consist of transparent plastic or comprise transparent plastic, as well.

According to a further expedient embodiment of the invention, the light scattering structure is generated by means of a laser. In a further advantageous embodiment of the invention, the light scattering structure comprises a number of punctiform defects which, in a favourable embodiment of the invention, may be generated in a plane of the transparent body. According to a yet further expedient embodiment of the invention, a part of the punctiform defects may be produced in a plane of the transparent body. According to yet another advantageous embodiment of the invention, the plane may be aligned orthogonally with regard to an optical axis of the headlight lens. In a yet another expedient embodiment of the invention the punctiform defects may be generated at random distribution.

In a further expedient embodiment of the invention, the optically operative surface facing away from the light source and/or the optically operative surface facing the light source may have a light scattering surface structure. An appropriate light scattering surface structure may comprise e.g. a modulation and/or a (surface) roughness of at least 0.05 µm, in particular at least 0.08µ, or be designed as a modulation, if necessary, with an additional (surface) roughness of at least 0.05 µm, in particular at least 0.08µ. Roughness in the sense of the invention is in particular to be defined as Ra, in particular according to ISO 4287. In a further advantageous embodiment of the invention, the light scattering surface structure may comprise a structure simulating the surface of a golf ball or may be designed as a structure imitating a golf ball surface. Appropriate light scattering surface structures have been disclosed e.g. in DE 10 2005 009 556, DE 102 26 471 B4 and DE 299 14 114 U1. Further embodiments of light scattering surface structures have been disclosed in German patent 1 099 964, DE 36 02 262 C2, DE 40 31 352 A1, U.S. Pat. No. 6,130,777, US 2001/0033726 A1, JP 10123307 A, JP 09159810 A and JP 01147403 A.

According to a still further advantageous embodiment of the invention, the headlight lens may be blank-moulded (bright-pressed), in particular on both sides. In the sense of the invention blank-moulding (also termed as bright pressing) is to be particularly understood by pressing an optically operative surface such that a subsequent finishing of the contour of this optically operative surface may be omitted or dispensed with or will not have to be provided for. Herein, a or the light scattering surface structure, respectively, may be embossed into the optically operative surface facing away from the light source and/or into the optically operative surface facing the light source.

The aforementioned object is moreover achieved by a headlight lens for a vehicle headlight, in particular for a motor vehicle headlight, and in particular by a headlight lens which has been manufactured according to a method as described before, wherein the headlight lens may comprise a transparent body which, in particular, may have been blank-moulded or bright-pressed, advantageously on both sides, and may have an essentially planar optically operative surface to face a light source and a particularly convexly curved optically operative surface to face away from the light source, wherein the optically operative surface facing away from the light source and/or the optically operative surface facing the light source may have a light scattering surface structure, and wherein a light scattering structure may be provided or generated in the transparent body. In the sense of the invention, a light scattering structure in the transparent body is a structure having been intentionally and/or specifically generated and can particularly be distinguished from an impurity within the lens or from a manufacturing error.

An appropriate light scattering surface structure for example may comprise a modulation and/or a (surface) roughness of at least 0.05 µm, in particular at least 0.08 µm, or may be designed as a modulation, if necessary having a (surface) roughness of at least 0.05 µm, in particular at least 0.08 µm. Roughness in the sense of the invention is particularly defined as Ra, in particular according to ISO 4287. In a yet further advantageous embodiment of the invention, the light scattering structure may comprise a structure simulating the surface of a golf ball or may be designed as a structure imitating a golf ball surface. Appropriate light scattering surface structures have e.g. been disclosed in DE 10 2005 009

556, DE 102 26 471 B4 and DE 299 14 114 U1. Further embodiments of light scattering surface structures have been disclosed in German Letters Patent 1 099 964, DE 36 02 262 C2, DE 40 31 352 A1, U.S. Pat. No. 6,130,777, US 2001/0033726 A1, JP 10123307 A, JP 09159810 A and JP 01147403 A.

According to an expedient embodiment of the invention, the light scattering structure may be a laser-induced structure. In a further expedient embodiment of the invention, the light scattering structure may comprise a number of punctiform (point or dot-shaped) defects which, in a furthermore favourable embodiment of the invention, may be arranged in a plane of the transparent body. In a yet further expedient embodiment of the invention, a part of the punctiform defects may be produced in a plane of the transparent body. According to yet another advantageous embodiment of the invention, the plane may be aligned orthogonally with regard to an optical axis of the headlight lens. In yet another expedient embodiment of the invention the punctiform defects may be distributed according to random distribution. It may also be provided that the light scattering structure may form a structure which is curved with respect to a plane which is orthogonal relative to the optical axis of the headlight lens. Herein, it may e.g. be provided that the light scattering structure regarding its curvature at least approximately follows the convexly curved surface of the headlight lens. It may also be provided that the light scattering structure in the interior of the headlight lens is more strongly curved than the convexly curved optically operative surface of the headlight lens.

The light scattering structure may be a structure designed for reducing the gradient of a light-dark-borderline to be imaged and/or for uncoupling light in a sub-illumination area outside the main illumination area and above the light-dark-borderline.

In a further advantageous embodiment of the invention, the headlight lens may externally comprise a lens edge or rim (integrally moulded) on the convexly curved optically operative surface, wherein the essentially planar optically operative surface may protrude beyond the lens edge or a part of the lens edge, advantageously in a step-shaped manner, in the direction of an optical axis of the headlight lens. Protruding in a step-shaped is particularly to mean that, in the sense of the invention, a transition is provided in the shape of at least one step. Herein, the step advantageously may essentially extend in parallel to an optical axis of the headlight lens.

In a yet further expedient embodiment of the invention, the essentially planar optically operative surface may protrude by no more than 1 mm, advantageously by not more than 0.5 mm, beyond the lens rim or a part of the lens rim in the direction of an optical axis of the headlight lens. This means in particular that the height of a step is no more than 1 mm, advantageously not more than 0.5 mm.

In a further advantageous embodiment of the invention, the thickness of the lens edge may be at least 2 mm. In a yet further expedient embodiment of the invention, the thickness of the lens edge is no more than 5 mm.

In a further advantageous embodiment of the invention, the diameter of the headlight lens may be at least 40 mm. In a yet further expedient embodiment of the invention, the diameter of the headlight lens is not more than 100 mm.

In a still further expedient embodiment of the invention, the diameter of the essentially planar optically operative surface may be no more than 110% of the diameter of the convexly curved optically operative surface. In a still further expedient embodiment of the invention, the diameter of the essentially planar optically operative surface is at least 90% of the diameter of the convexly curved optically operative surface.

The essentially planar optically operative surface and/or the convexly curved optically operative surface may be, in one embodiment of the invention, round, in particular circular or essentially circular.

In a yet further advantageous embodiment of the invention, the surface of the lens edge or at least an overwhelming or essential part of the surface of the lens edge may extend essentially in parallel to the optical axis of the headlight lens at the outer circumference of the lens edge. In this context, essentially in parallel to the optical axis is to mean or to comprise particularly an inclination of 0° to 8°, in particular 0° to 5° relative to the optical axis.

Besides, the aforementioned object is also solved by a vehicle headlight, in particular a motor vehicle headlight, having a light source, a shield and a headlight lens, in particular designed according to any one of the preceding features, for imaging an edge of the shield as a light-dark-borderline. Herein, the light scattering structure may be a structure designed to reduce the gradient of the light-dark-borderline and/or to uncouple light in a sub-illumination area outside the main illumination area and above the light-dark-borderline.

In an advantageous embodiment of the invention, the vehicle headlight is (at least as well) designed as a dipped or dimmed headlight. In a further advantageous embodiment of the invention, the gradient of the light-dark-borderline may be no more than 0.5. In a yet further advantageous embodiment of the invention, the glare (value) of the vehicle headlight may amount to no more than 1.5 lux.

The aforementioned object is also achieved by a vehicle including an aforementioned vehicle headlight, wherein the light-dark-borderline, according to an advantageous embodiment of the invention, may be imaged onto a roadway on which the vehicle can be positioned.

The aforementioned object may moreover be achieved by an apparatus for manufacturing a headlight lens for a vehicle headlight, in particular for a motor vehicle headlight, wherein the apparatus comprises a gradient measuring arrangement for measuring the gradient of a light-dark-borderline imaged by a headlight lens as well as an illumination source arrangement for generating a light scattering structure in a headlight lens, which illumination source arrangement advantageously comprises at least one laser, and wherein the apparatus includes a control for triggering or actuating the illumination source arrangement depending on the or a measured gradient.

In the sense of the invention, optically operative surfaces may have, in particular, a light transmission of at least 90%.

Figure 2:
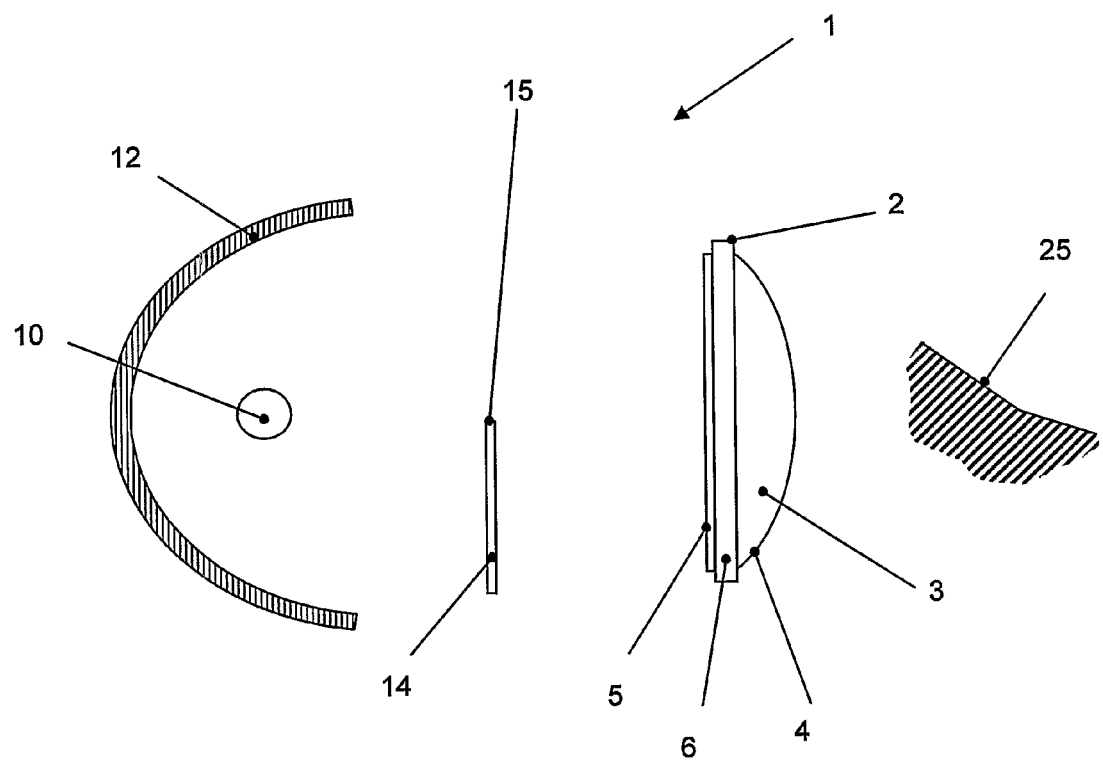
Figure 3:
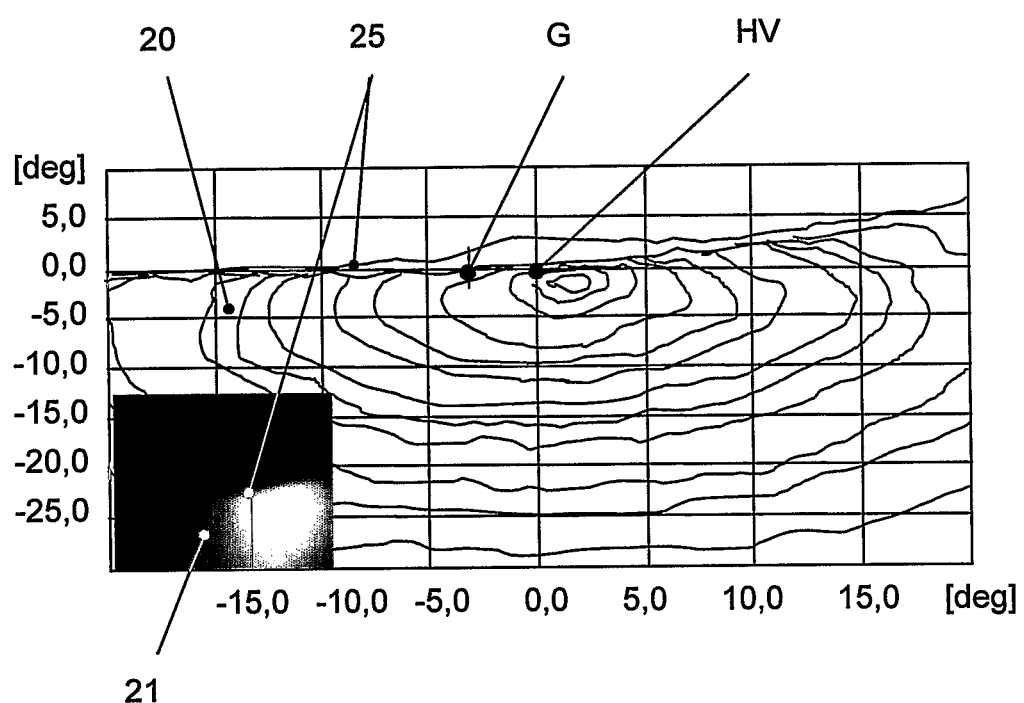
Figure 4:
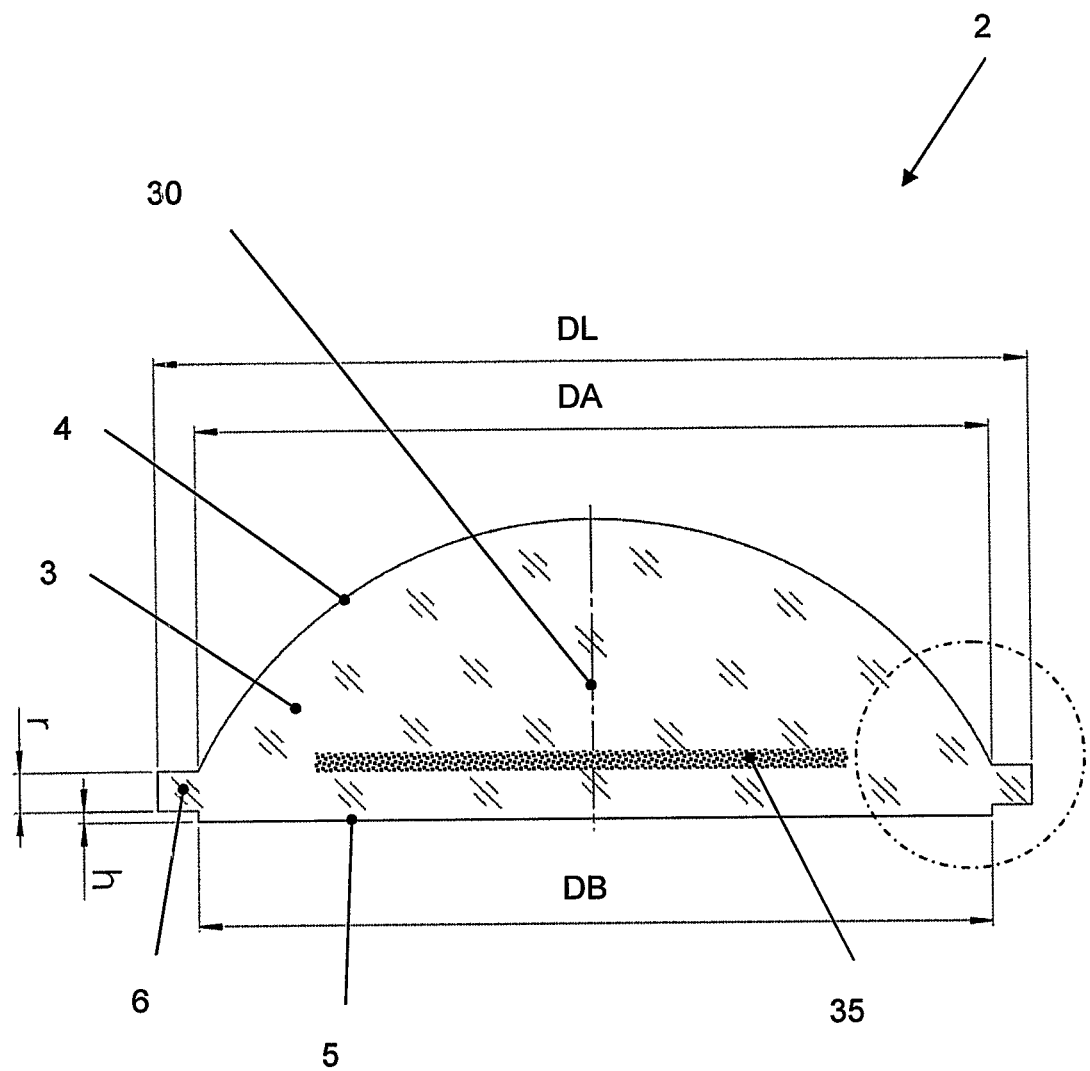
Figure 5:
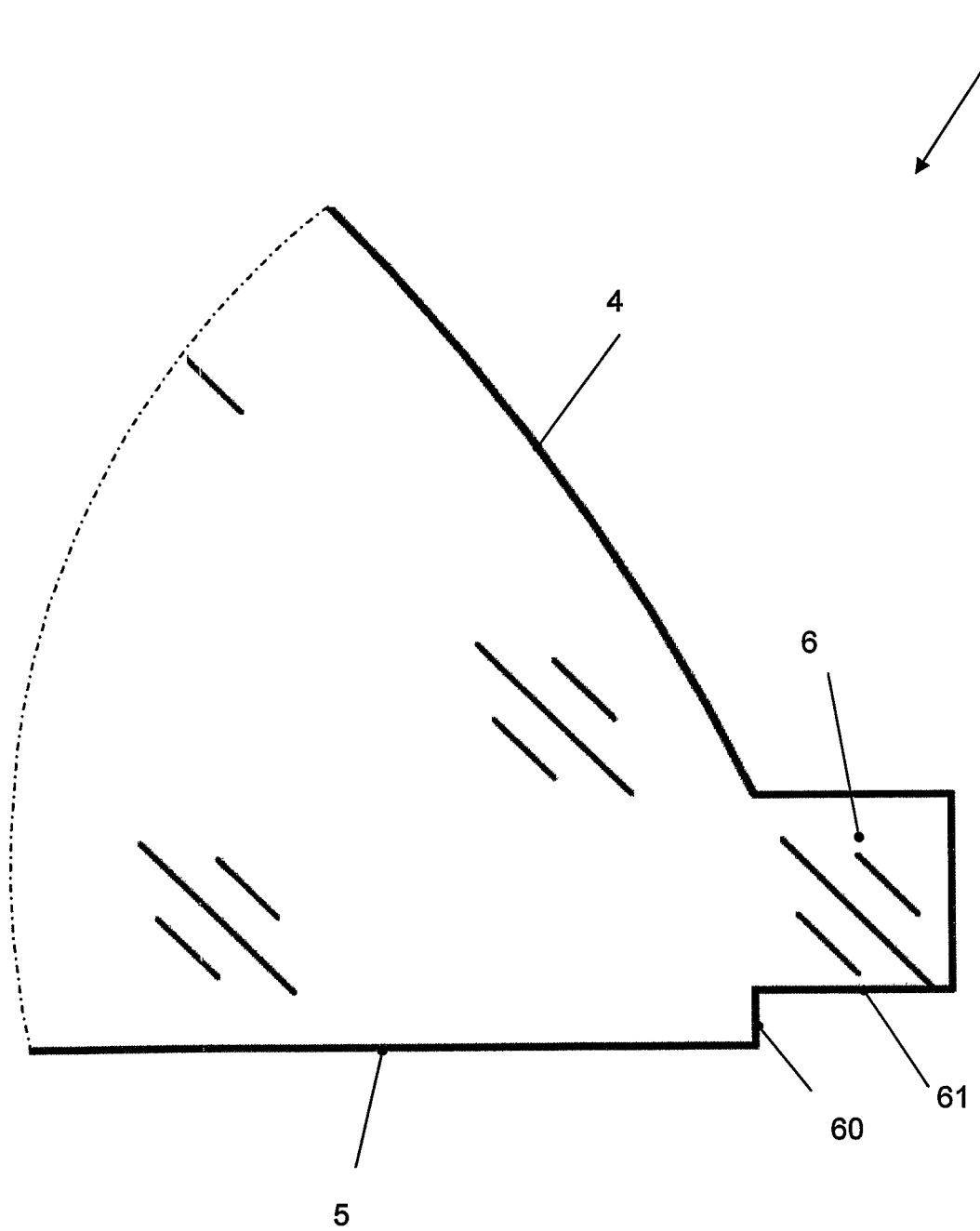
Figure 6:
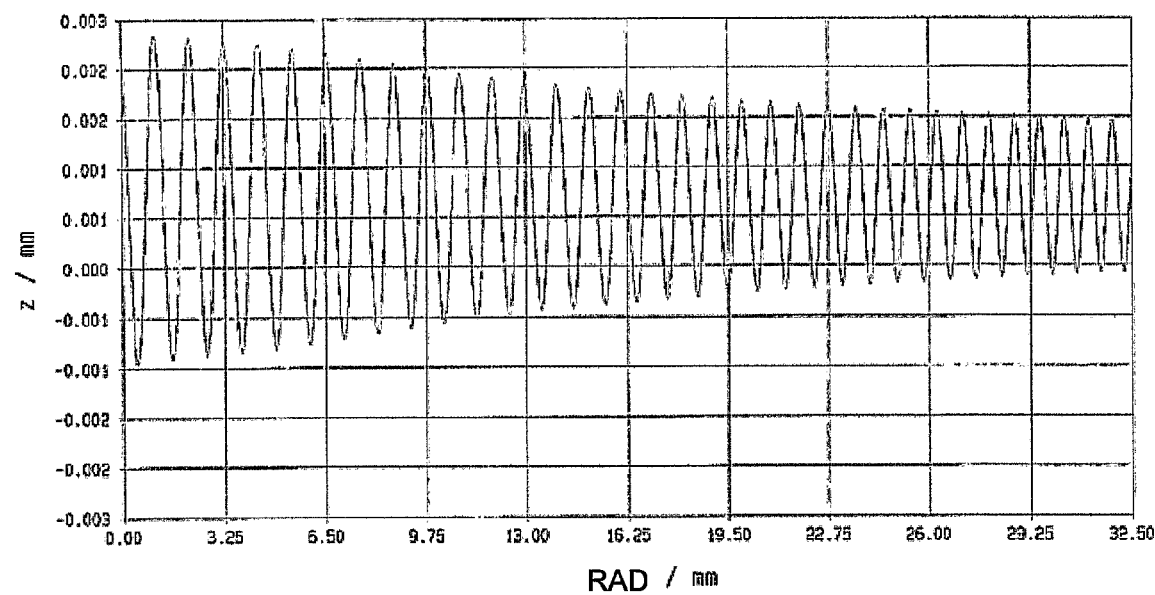
Figure 7:
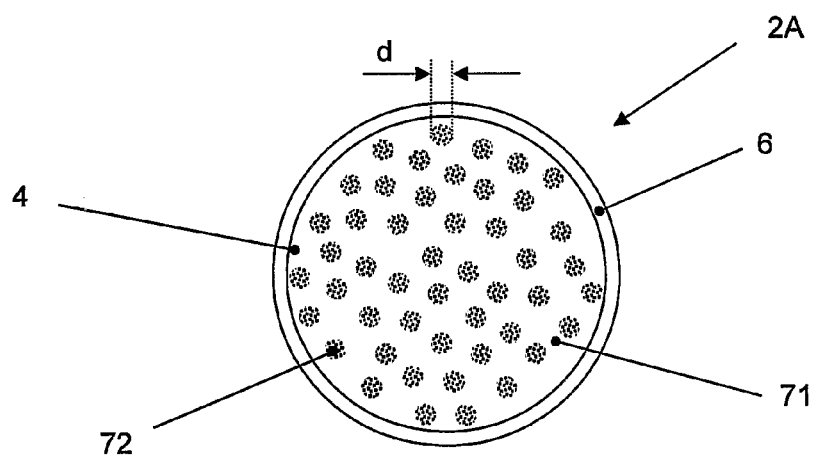
Figure 8:
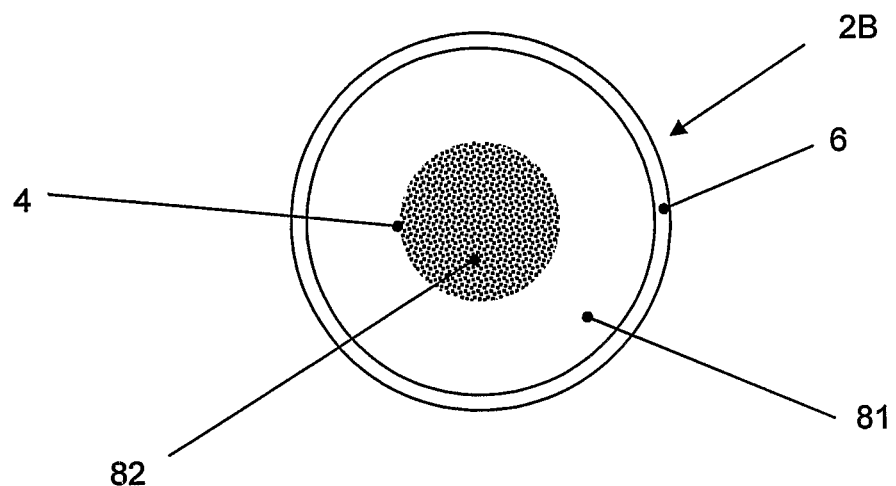
Figure 9:
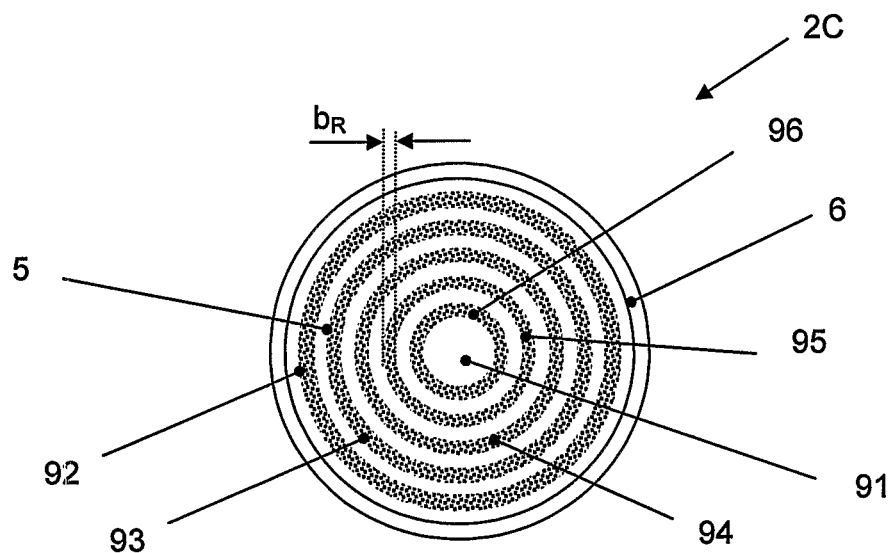
Figure 10:
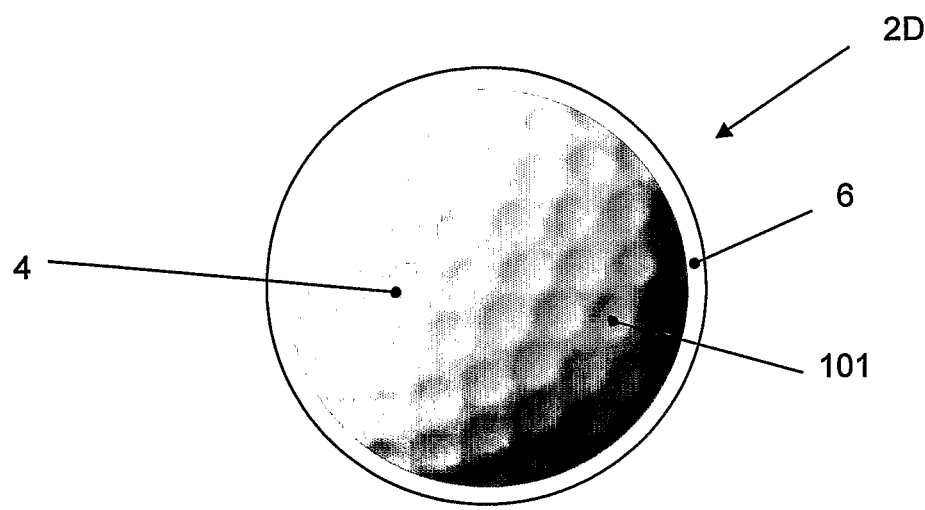
Figure 11:
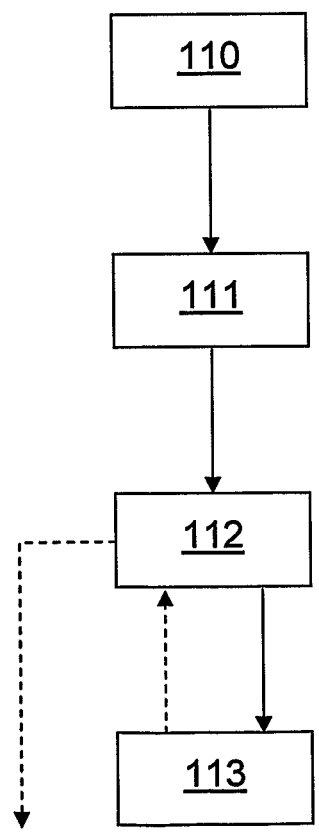
Figure 12:
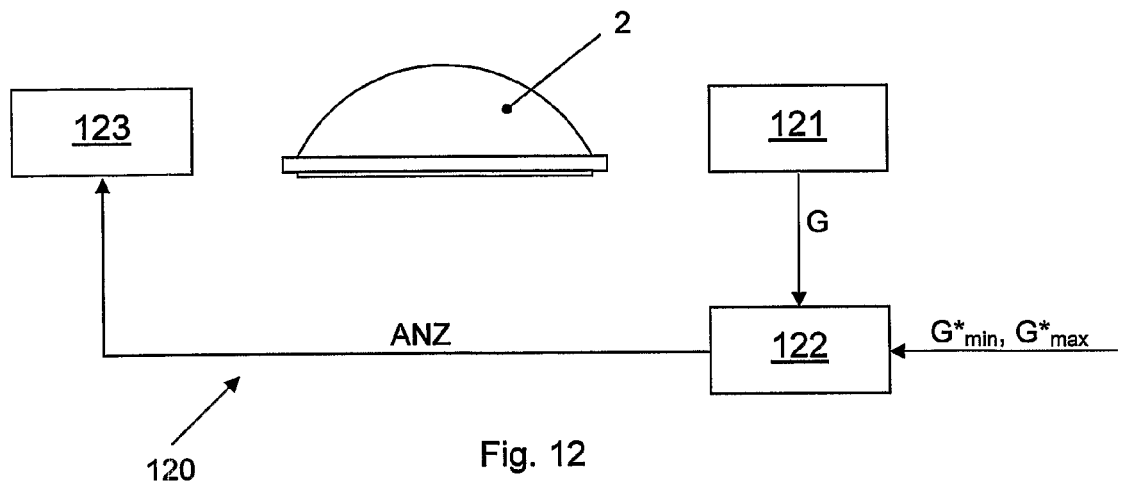
Figure 13:
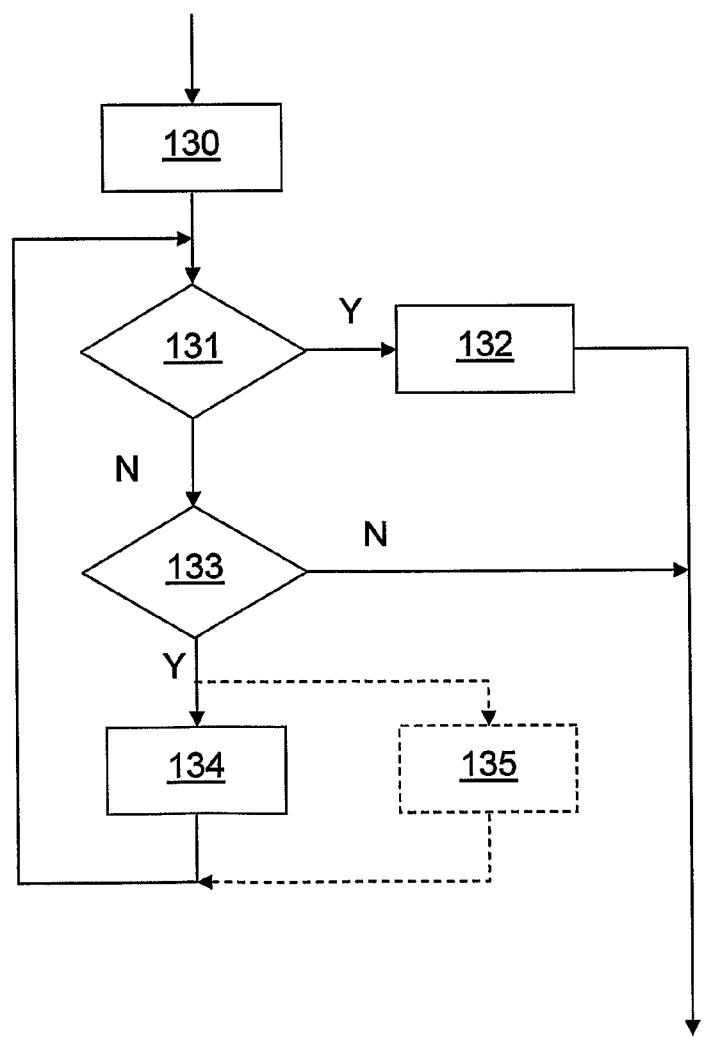
Figure 14:
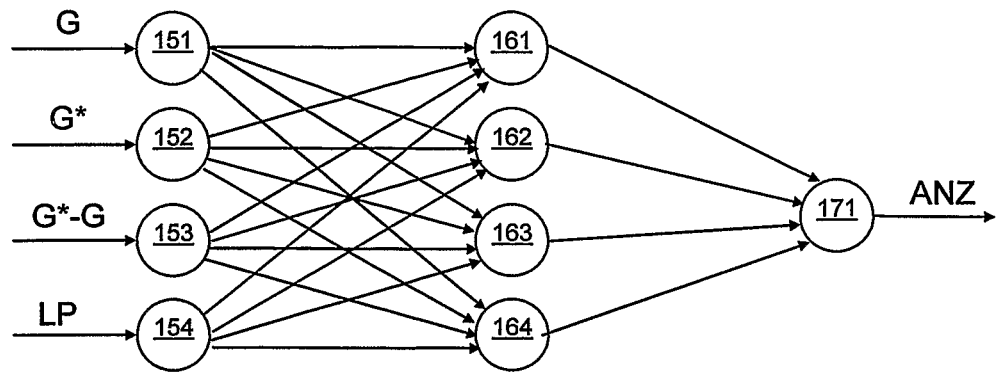
Figure 15:
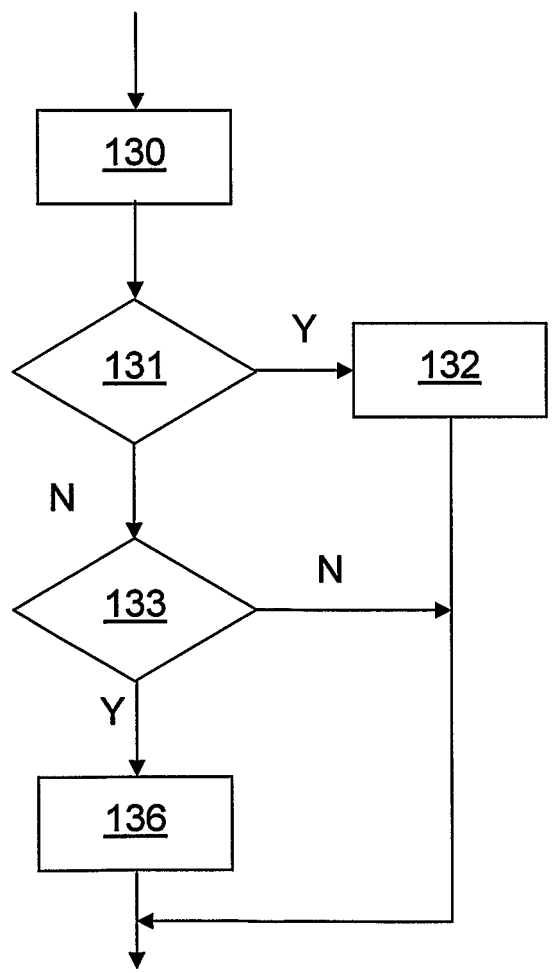
Figure 16:
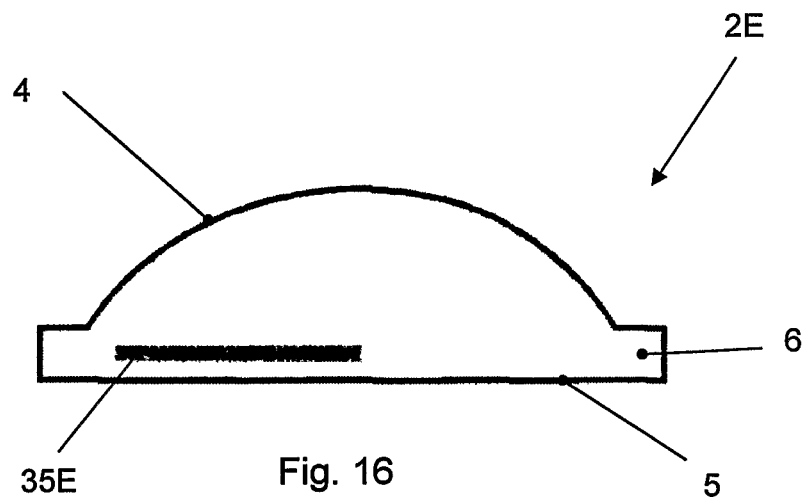
Figure 17:
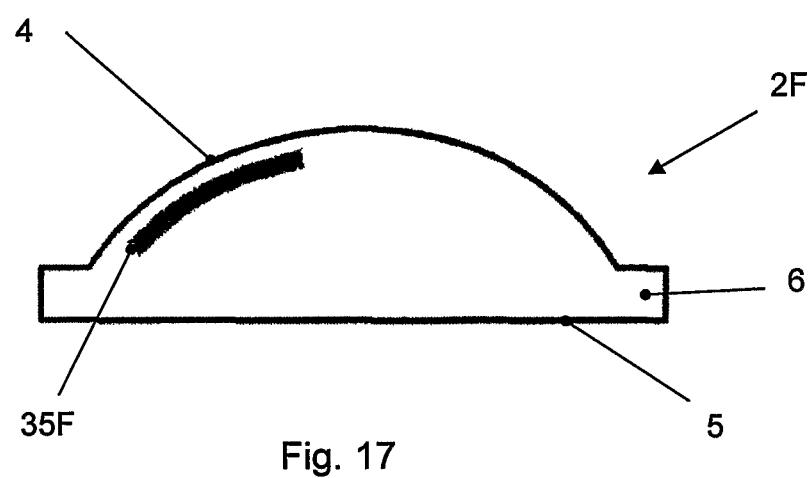
Figure 18:
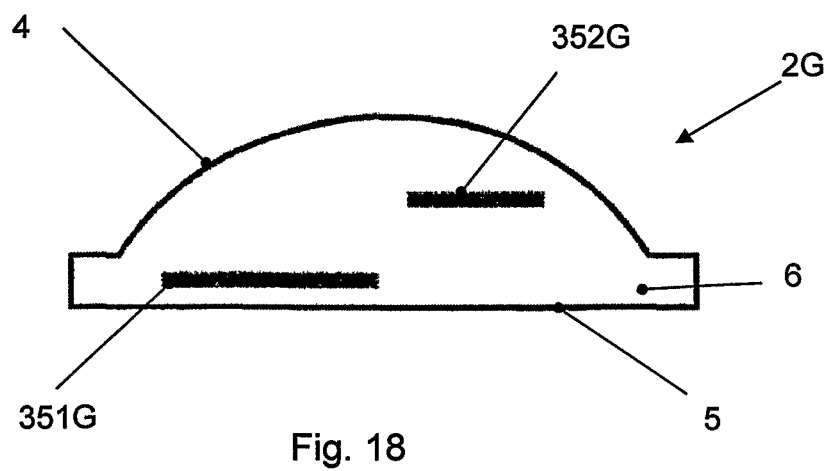
Figure 19:
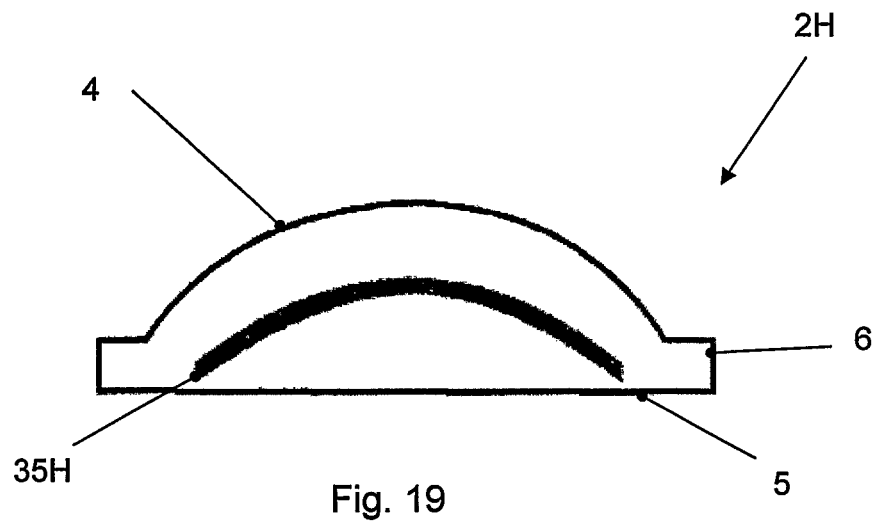
Figure 20:
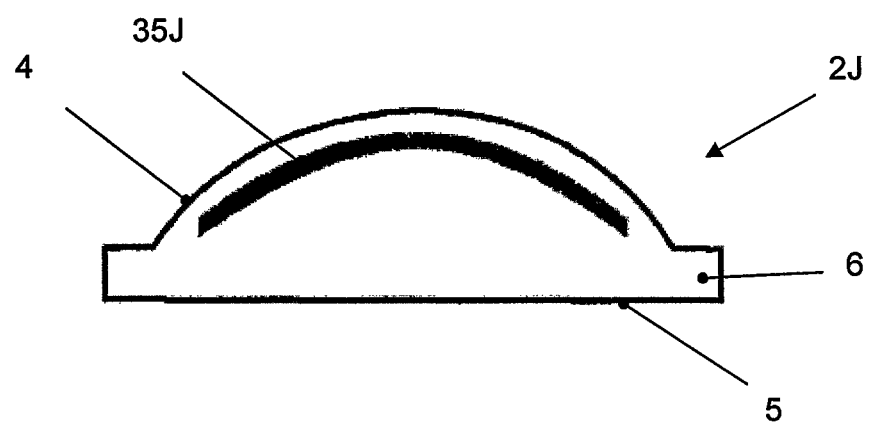
Figure 21:
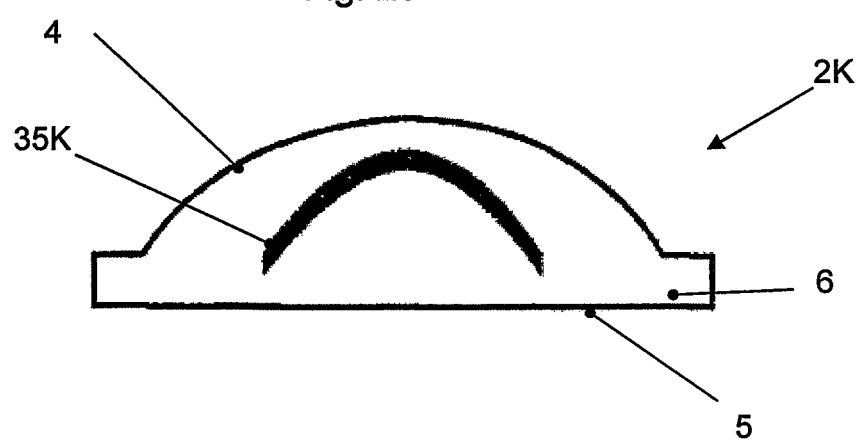
Figure 22:
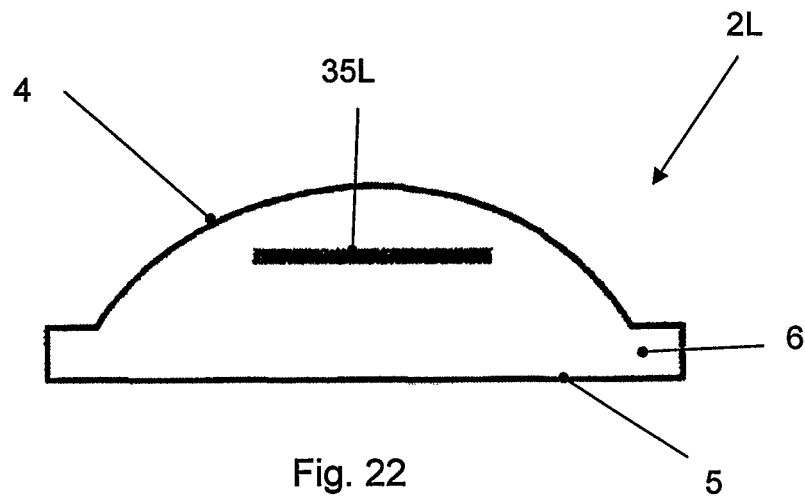
Figure 23:
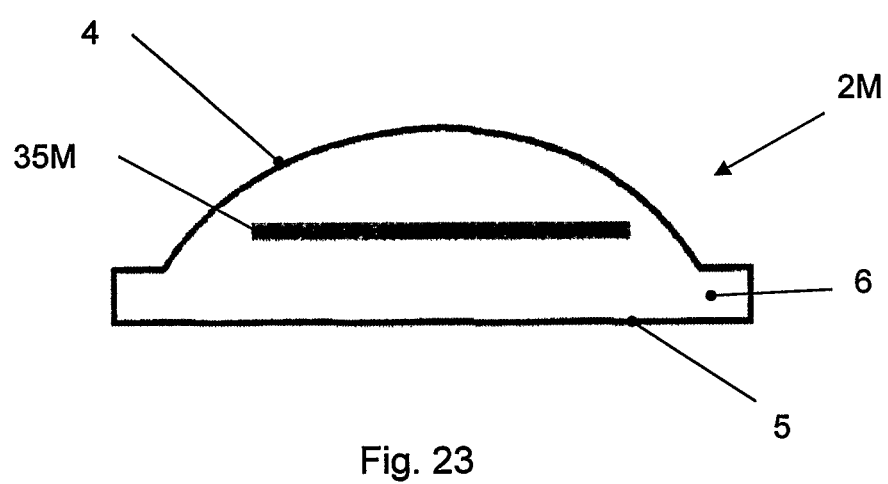
Figure 24:
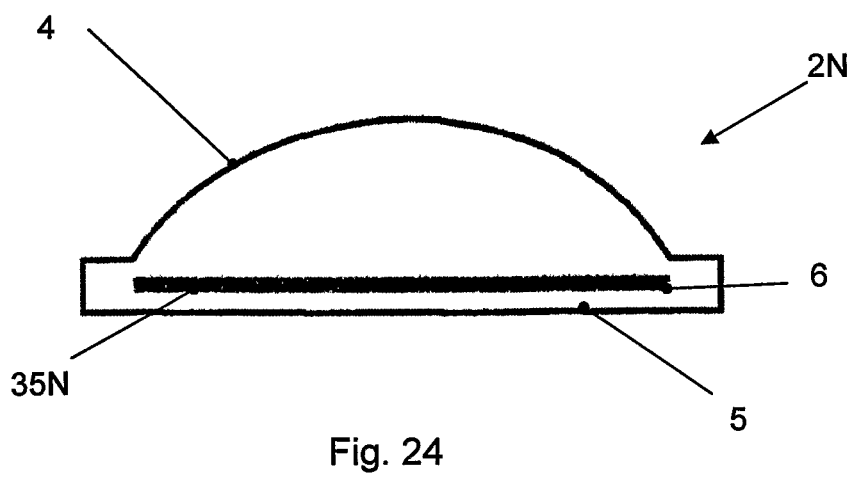
Figure 25:
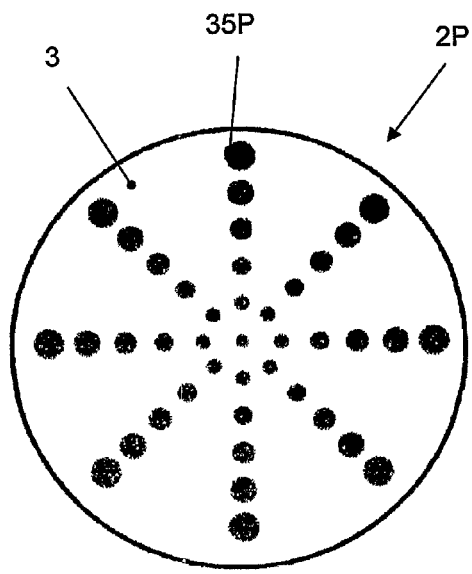
Figure 26:
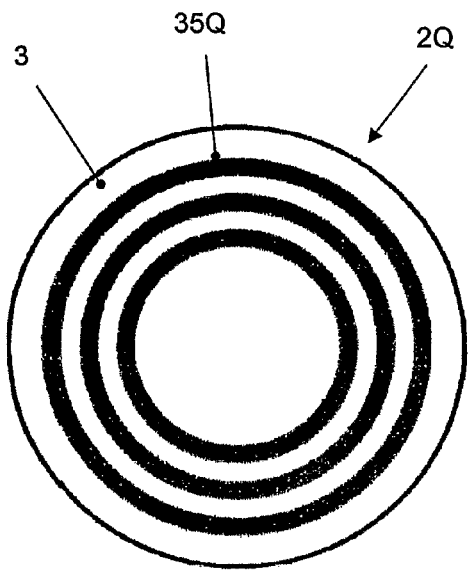
Figure 27:
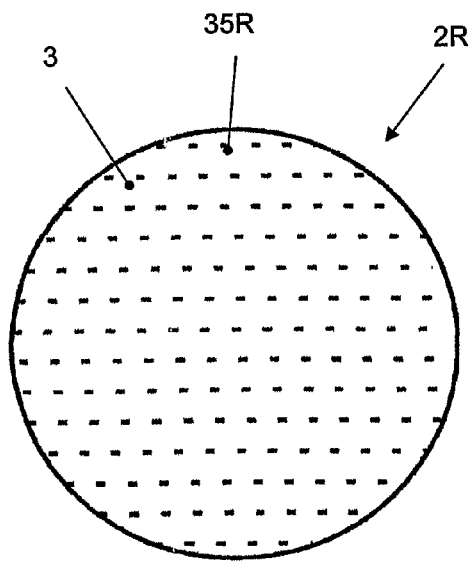
Figure 28:
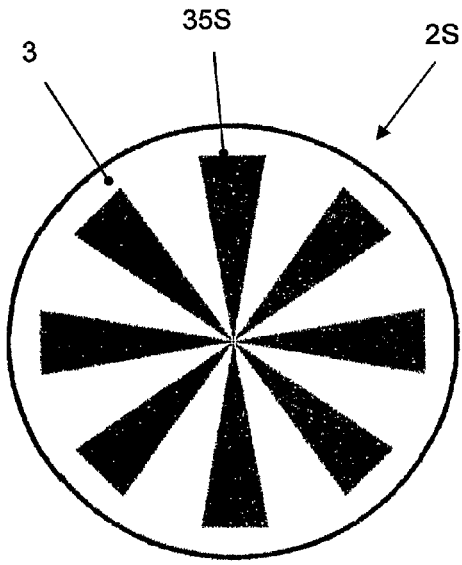
Figure 29:
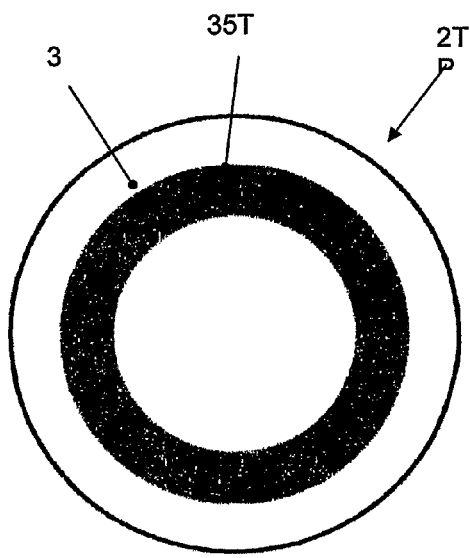
Figure 30:
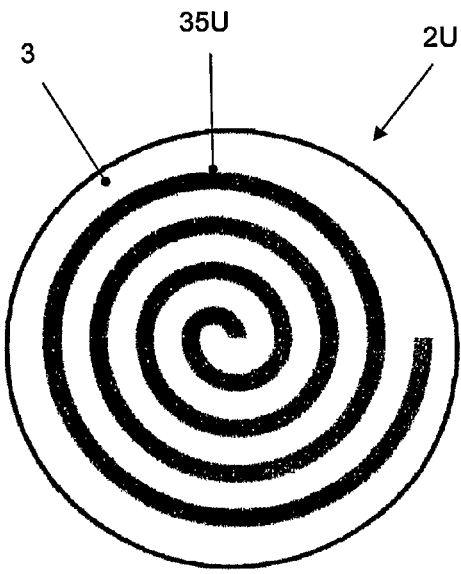
Figure 31:
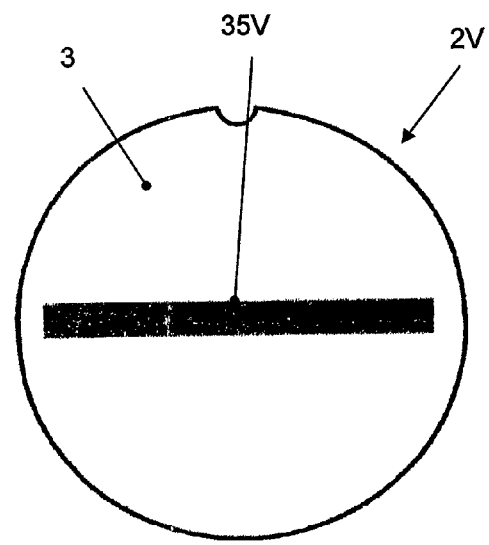
Figure 32:
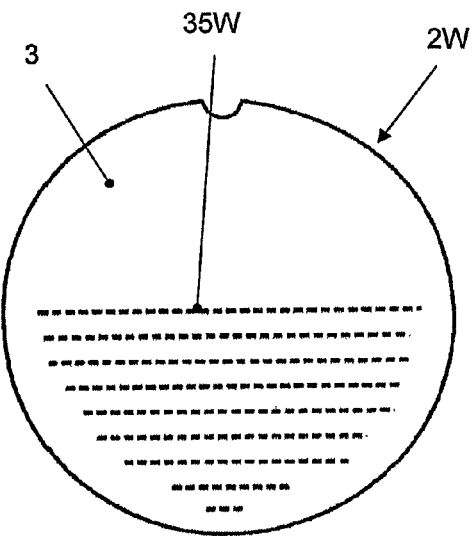
Figure 33:
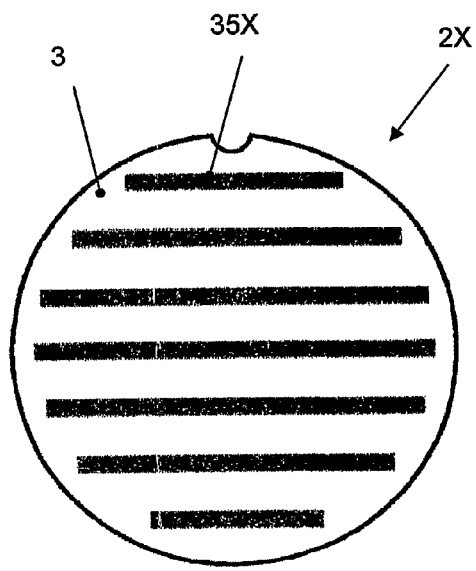
Figure 34:
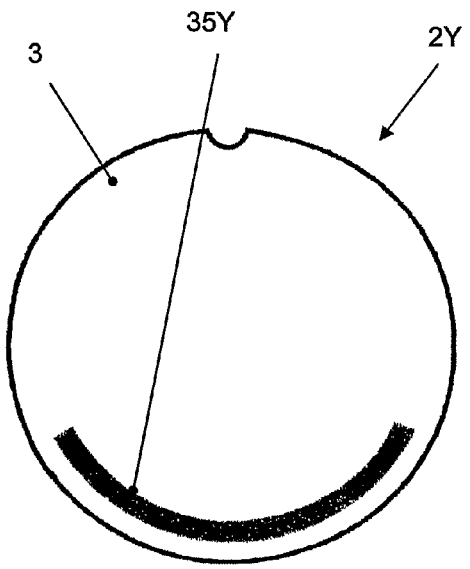
Figure 35:
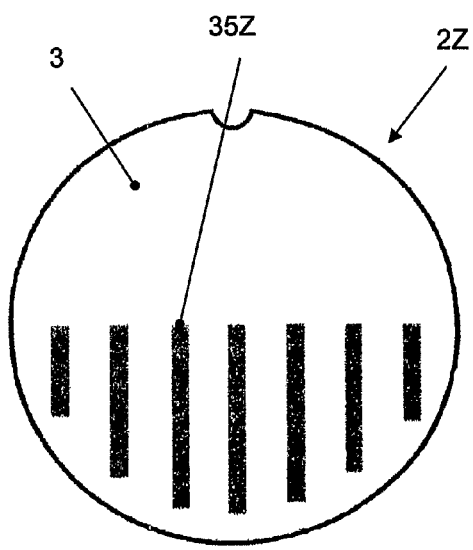
Figure 36:
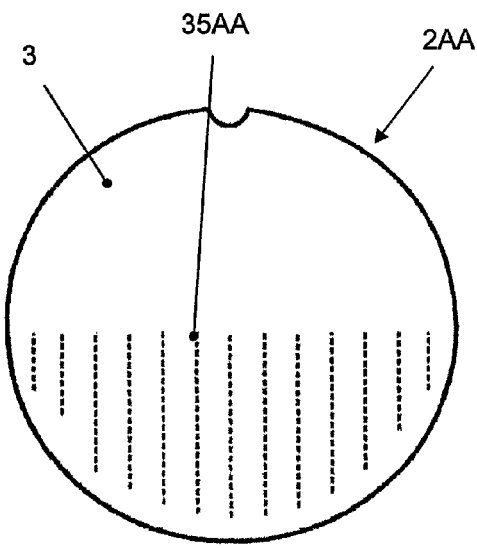
Figure 37:
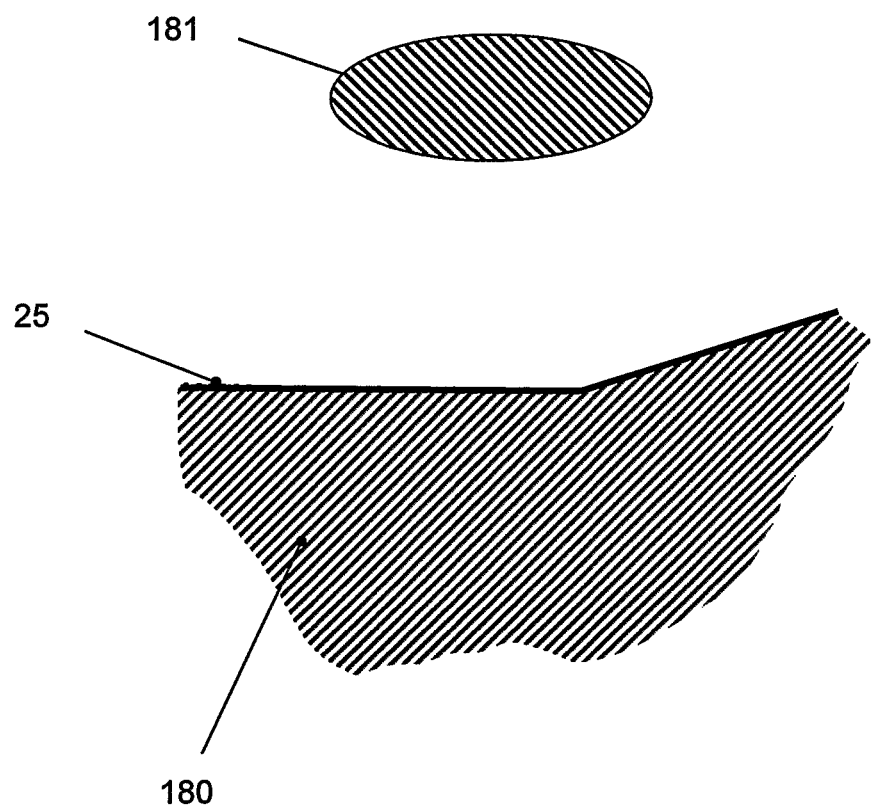

Further advantages and details may be taken from the following specification of examples of embodiment. Accordingly, there is shown in:

FIG. 1 an example of embodiment of a motor vehicle,

FIG. 2 a schematic representation of an exemplary motor vehicle headlight,

FIG. 3 an example of the illumination distribution of the headlight according to FIG. 2, FIG. 4 a cross-section through an example of embodiment of a headlight lens for a vehicle headlight according to FIG. 2, FIG. 5 a cut-out of the cross-section according to FIG. 4, FIG. 6 an example of embodiment of a modulation of an optically operative surface of the headlight lens according to FIG. 2, FIG. 7 an alternative example of embodiment of a headlight lens, FIG. 8 a further alternative example of embodiment of a headlight lens, FIG. 9 a further alternative example of embodiment of a headlight lens, FIG. 10 a further alternative example of embodiment of a headlight lens, FIG. 11 an example of embodiment of a method for manufacturing a headlight lens according to FIG. 3, FIG. 12 an example of embodiment of an apparatus for manufacturing a headlight lens according to FIG. 3, FIG. 13 an example of embodiment of a method implemented in a control for manufacturing a headlight lens according to FIG. 3, FIG. 14 an example of embodiment of a neuronal network, FIG. 15 a further example of embodiment of a method implemented in a control for manufacturing a headlight lens according to FIG. 3, FIG. 16 a further alternative example of embodiment of a headlight lens, FIG. 17 a further alternative example of embodiment of a headlight lens, FIG. 18 a further alternative example of embodiment of a headlight lens, FIG. 19 a further alternative example of embodiment of a headlight lens, FIG. 20 a further alternative example of embodiment of a headlight lens, FIG. 21 a further alternative example of embodiment of a headlight lens, FIG. 22 a further alternative example of embodiment of a headlight lens, FIG. 23 a further alternative example of embodiment of a headlight lens, FIG. 24 a further alternative example of embodiment of a headlight lens, FIG. 25 a further alternative example of embodiment of a headlight lens, FIG. 26 a further alternative example of embodiment of a headlight lens, FIG. 27 a further alternative example of embodiment of a headlight lens, FIG. 28 a further alternative example of embodiment of a headlight lens, FIG. 29 a further alternative example of embodiment of a headlight lens, FIG. 30 a further alternative example of embodiment of a headlight lens, FIG. 31 a further alternative example of embodiment of a headlight lens, FIG. 32 a further alternative example of embodiment of a headlight lens, FIG. 33 a further alternative example of embodiment of a headlight lens, FIG. 34 a further alternative example of embodiment of a headlight lens, FIG. 35 a further alternative example of embodiment of a headlight lens, FIG. 36 a further alternative example of embodiment of a headlight lens, and FIG. 37 an example of embodiment of a sub-illumination area.

FIG. 1 shows a vehicle 100 with a vehicle headlight 1 schematically depicted in FIG. 2 including a light source 10 for generating light, a reflector 12 for reflecting light generated by means of the light source 10, and a shield 14. The vehicle headlight 1 moreover comprises an integral headlight lens 2 blank-moulded (bright-pressed) on both sides for changing the beam direction of light to be generated by means of the light source 10, and in particular for imaging an edge of the shield 14, which edge has been designated by reference numeral 15 in FIG. 2, as a light-dark-borderline 25, as has been represented, by way of example, in FIG. 3 in a diagram 20 and in a photograph 21. Herein, the gradient G of the light-dark-borderline 25 and the glare (value) HV of the vehicle headlight 1 in which the headlight lens 2 has been installed, are important photometric standards or guide values.

The headlight lens 2 comprises a lens body 3 made of transparent material, in particular glass, which body comprises an essentially planar optically effective or operative surface 5 facing the light source 10 and a convexly curved optically effective or operative surface 4 turned or facing away from the light source 10. Moreover, the headlight lens 2 optionally comprises an edge 6, by means of which the headlight lens 2 can be attached within the vehicle headlight 1. The elements of FIG. 2 have been depicted in consideration of simplicity and clearness and not necessarily true to scale. In this respect, for example the orders of size of some of the elements have been represented in an exaggerated manner relative to other elements in order to improve comprehension of the example of embodiment of the present invention.

FIG. 4 shows a cross-section through an example of embodiment of the headlight lens 2 for the vehicle headlight 1 according to FIG. 2. FIG. 5 shows a cut-out of the headlight lens 2, which cut-out has been marked by means of a dash-dotted circle in FIG. 4. The essentially planar optically operative surface 5, shaped as a step 60, projects, in the direction of the optical axis 30 of the headlight lens 2, beyond the lens edge 6 or beyond the surface 61 of the lens edge 6 facing the light source 10, wherein the height h of the step 60 amounts to no more than 1 mm, advantageously no more than 0.5 mm. The effective value of height h of step 60 is expediently 0.2 mm.

The thickness r of the lens edge 6 is at least 2 mm but not more than 5 mm. The diameter DL of the headlight lens 2 amounts to at least 40 mm but no more than 100 mm. The diameter DB of the essentially planar optically operative surface 5 equals the diameter DA of the convexly curved optically operative surface 4. In an advantageous embodiment, the diameter DB of the essentially planar optically operative surface 5 is no more than 110% of the diameter DA of the convexly curved optically operative surface 4. Moreover, the diameter DB of the essentially planar optically operative surface 5 is advantageously at least 90% of diameter DA of the convexly curved optically operative surface 4. Expediently, the diameter DL of the headlight lens 2 is approximately 5 mm larger than diameter DB of the essentially planar optically operative surface 5 or than the diameter DA of the convexly curved optically operative surface 4.

In the interior of the transparent body 3 the headlight lens 2 has a structure 35 scattering light. The light scattering structure 35 is advantageously a structure generated by means of a laser. Herein, it comprises advantageously a number of punctiform defects which are aligned with respect to a plane which is orthogonal with respect to the optical axis 30. It may be provided that the scattering structure 35 is designed to be ring-shaped or comprises annular regions or that the punctiform defects are arranged in the manner rings. It may be provided that the punctiform defects are distributed at random, in particular within the selected structure.

For example, appropriate methods for generating the light scattering structure 35 in the interior of the transparent body 3 may be taken from SU 1838163 A3, SU 1818307 A1, the article "Optical applications of laser-induced gratings in Eu-doped glasses", Edward G. Behrens, Richard C. Powell, Douglas H. Blackburn, 10 Apr. 1990/Vol. 29, No. 11/APPLIED OPTICS, the article "Relationship between laser-induced gratings and vibrational properties of Eu-doped glasses", Frederic M. Durville, Edward G. Behrens, Richard C. Powell, 35, 4109, 1987, The American Physical Society, the article "Laser-induced refractive-index gratings in Eu-doped glasses", Frederic M. Durville, Edward G. Behrens, Richard C. Powell, 34, 4213, 1986, The American Physical Society, the article "Interior Treatment of Glass by means of Nd: YAG-Laser" ("Innenbearbeitung von Glas mit Nd: YAG-Laser"), Klaus Dickmann, Elena Dik, Laser Magazin, as well as the state of the art cited in U.S. Pat. No. 6,992,804 B2.

FIG. 6 shows as example of embodiment of a modulation of an optically operative surface 4 of the headlight lens 2. Herein, RAD designates the radial distance along the optically operative surface 4 from the passage point of the optical axis 30 through the optically operative surface 4. Reference sign z designates the modulation. Herein, it is provided that the amplitude of modulation z follows a fading-out envelope.

FIG. 7 shows an alternative example of embodiment of a headlight lens 2A for use instead of the headlight lens 2. Therein, several essentially circle-shaped areas 72 having a diameter d between 0.5 mm and 10 mm and a (surface) roughness of at least 0.05 µm, in particular at least 0.08 µm are arranged on the optically operative surface 4 facing away from the light source 10. In the present example of embodiment, the essentially circular areas 72 have a roughness of 0.6 µm. Reference numeral 71 designates the portion of the optically operative surface 4 facing away from the light source 10, which portion is not covered by the essentially circular areas 72. The surface of this portion is blank/bright, i.e. it has a roughness of approximately less than 0.04 µm. It may, however, also be provided that this portion is not blank/bright but has a roughness which differs from the roughness of the essentially circular areas 72. The essentially circular areas 72 cover 5% to 50% of the optically operative surface 4 facing away from the light source 10.

FIG. 8 shows a further alternative example of embodiment of a headlight lens 2B for use instead of the headlight lens 2. Therein, an essentially circular surface 82 having a (surface) roughness of at least 0.05 µm, in particular at least 0.08 µm, is arranged on the optically operative surface 4 facing away from the light source 10. In the present example of embodiment, the essentially circular surface 42 has a roughness of 0.2 µm. Reference numeral 81 designates such part of the optically operative surface 4 facing away from the light source 10 which is not covered by the essentially circular surface 82. The surface of this part is blank, i.e. it has a roughness of approximately less than 0.04 µm. It may, however, also be provided that this portion is not blank but has a roughness which differs from the roughness of the essentially circular surface 82. The essentially circular surface 82 covers at least 5% of the optically operative surface 4 facing away from the light source 10.

FIG. 9 shows a further alternative example of embodiment of a headlight lens 2C for use instead of the headlight lens 2. Therein, a plurality of essentially ring-shaped areas 92, 93, 94, 95, 96 arranged within each other and having a ring width $b_R$ of between 1 mm and 4 mm and a (surface) roughness of at least 0.05 µm, in particular at least 0.08 µm, is arranged on the essentially planar surface 5 facing the light source 10. In the present example of embodiment, the essentially ring-shaped areas 92, 93, 94, 95, 96 have a roughness of 0.1 µm. Reference numeral 91 designates such portion of the essentially planar surface 5 facing the light source 10 which is not covered by the essentially ring-shaped areas 92, 93, 94, 95, 96. The surface of this portion is blank, i.e. it has a roughness of approximately less than 0.04 µm. It may, however, also be provided that this portion is not blank but has a roughness which differs from the roughness of the essentially circular areas 22. The essentially ring-shaped areas 92, 93, 94, 95, 96 cover 20% to 70% of the essentially planar surface side 5 facing the light source 10.

FIG. 10 shows a further alternative example of embodiment of a headlight lens 2D for use instead of the headlight lens 2. Herein, the optically operative surface 4 facing away from the light source 10 has a surface structure 101 simulating the surface of a golf ball. A similar surface structure may also be generated by a modulation z represented in FIG. 6, which is superimposed by a modulation extending orthogonally thereof (i.e. on a [concentric] circle around the optical axis 30).

FIG. 11 shows a process for manufacturing the headlight lens 2 or one of the headlight lenses 2A, 2B, 2C or 2D. Herein, a step 110 comprises the method steps and measures which are performed prior to the pressing of the lens as such in step 111. The measures and operational steps summarized in step 110 may for example include the melting of glass, the producing of a pre-mould, the cooling-off of a pre-mould, the heating of a pre-mould etc.

In step 111 and subsequent to step 110 the headlight lens 2, 2A, 2B, 2C, or 2D is pressed. Thereby, and in an advantageous embodiment, the corresponding surface structure 72, 82, 92, 93, 94, 95, 96, 101, z is pressed such that the following applies:

$$G^*_{MIN} \geq G^*_{max},$$

wherein $G^*_{MIN}$ is the minimum value of the manufacturing tolerance for gradient G of a pressed headlight lens 2, 2A, 2B, 2C or 2D, and wherein $G^*_{max}$ is the upper (admissible) nominal value for gradient G.

After the pressing of the headlight lens in step 111, it is cooled off slowly while adding heat (step 112). A step 113 follows, in which the (light) refracting structure 35 is generated in the interior of the transparent body 3. There may also be provided that step 113 be performed during step 112. Thus, for example a partially cooled headlight lens may be taken from a corresponding cooling section and guided back to the cooling section again after a corresponding light scattering structure has been generated in its interior.

FIG. 12 shows an example of embodiment of an apparatus for manufacturing a headlight lens 2A, 2B, 2C, or 2D corresponding to headlight lens 2. The apparatus 120 comprises a gradient measuring arrangement 121 for measuring the gradient G of the light-dark-borderline 25 imaged by the headlight lens 2. Furthermore, the apparatus 120 comprises an illumination or radiation source arrangement 123 advantageously including lasers for producing the light scattering structure 35 in the interior of the headlight lens 2. Appropriate apparatuses for designing the illumination or light beam source arrangement 123 may, for example, be taken from SU 1838163 A3, SU 1818307 A1, the article "Optical applications of laser-induced gratings in Eu-doped glasses", Edward G. Behrens, Richard C. Powell, Douglas H. Blackburn, 10 Apr. 1990/Vol. 29, Nr. 11/APPLIED OPTICS, the article "Relationship between laser-induced gratings and vibrational properties of Eu-doped glasses", Frederic M. Durville, Edward G. Behrens, Richard C. Powell, 35, 4109, 1987, The American Physical Society, the article "Laser-induced refractive-index gratings in Eu-doped glasses", Frederic M. Durville, Edward G. Behrens, Richard C. Powell, 34, 4213, 1986, The American Physical Society, the article "Interior Treatment of Glass by means of Nd: YAG-Laser" ("Innenbearbeitung von Glas mit Nd: YAG-Laser"), Klaus Dickmann, Elena Dik, Laser Magazin, as well as the state of the art cited in U.S. Pat. No. 6,992,804 B2.

In the present example of embodiment, the apparatus 120 for manufacturing the headlight lens 2 comprises a control 122 for actuating the illumination source arrangement 123 depending on any one or the measured gradient G as well as the lower (admissible) nominal value $G^*_{min}$ for the gradient G and an (admissible) upper nominal value $G^*_{max}$ for gradient G.

FIG. 13 shows an example of embodiment of a method implemented within the control 122. The method starts by a step 130 in which the measured value of gradient G is read in by the gradient measuring arrangement 121. Step 130 is followed by a query 131 whether $$G < G^*_{min}$$

applies. If $$G < G^*_{min}$$

applies, the corresponding lens is separated out in step 132. If, however, there applies $$G \geq G^*_{min},$$

query 131 is followed by query 133 whether $$G > G^*_{max}$$

applies. If $$G > G^*_{max}$$

applies, a certain number ANZ of punctiform defects is produced in the interior of the headlight lens in a step 134. Subsequent to step 134, a new measured value for gradient G is read in a step 130.

It may be provided that in a step 135 occurring in parallel to step 134 a neuronal network is exercised, as has been represented, by way of example only, in FIG. 14. In this context, the neuronal network represented in FIG. 14 comprises four input nodes 151, 152, 153, 154, an intermediate layer having four nodes 161, 162, 163, 164, as well as an output node 171. The measured gradient, a nominal value G* for the gradient, the difference G*−G between the nominal value G* of the gradient and the measured gradient G, as well as at least one lens parameter LP, such as e.g. the type of the lens, the thickness thereof, the focal length thereof or its diameter are the input quantities to the input nodes 151, 152, 153, and 154. The nominal value G* of gradient G is a value from the interval [$G^*_{min}$, $G^*_{max}$]. The nominal value G* of the gradient is herein advantageously calculated according to $$G^* = \frac{G^*_{min} + G^*_{max}}{2}$$

Herein, the output quantity from output node 171 is the number ANZ of punctiform defects which are generated within the headlight lens 2.

FIG. 15 shows an alternative method regarding the method described with reference to FIG. 13, which alternative method may be implemented in control 122. Herein, the same reference numerals as in FIG. 13 correspond to same queries and steps, resp. In contrast to the method described with reference to FIG. 13, in the method described with reference to FIG. 15 the query 133 is followed by a step 136 with the number ANZ of the punctiform defects in the interior of the headlight lens being determined by means of the neuronal network represented in FIG. 14. A repeated measuring and correspondingly carried out adjusting as have been described with reference to FIG. 13 may be omitted.

In an advantageous embodiment of the described methods, the punctiform defects are generated in the headlight lens whose gradient G has been measured. It may, however, also be provided that the number of the punctiform defects is detected depending on the measured quantity of gradient G for another headlight lens. Thus, it may e.g. be provided that the measured value may be used for a headlight lens in order to generate specifically punctiform defects or other corresponding light-refractive structures for the subsequent five headlight lenses. FIG. 16 through FIG. 36 show alternative embodiments of headlight lenses 2E, 2F, 2G, 2H, 2J, 2K, 2L, 2M, 2N, 2P, 2Q, 2R, 2S, 2T, 2U, 2V, 2W, 2X, 2Y, 2Z, 2AA including different examples of embodiment of light scattering structures 35E, 35F, 351G, 352G, 35H, 35J, 35K, 35L, 35M, 35N, 35P, 35Q, 35R, 35S, 35T, 35U, 35V, 35W, 35X, 35Y, 35Z, 35AA in the transparent bodies 3 of the headlight lenses 2E, 2F, 2G, 2H, 2J, 2K, 2L, 2M, 2N, 2P, 2Q, 2R, 2S, 2T, 2U, 2V, 2W, 2X, 2Y, 2Z, 2AA. Herein, the headlight lenses 2E, 2F, 2G, 2H, 2J, 2K, 2L, 2M, 2N are shown by way of a cross-section having a cross-sectional face extending parallel to the optical axes of the headlight lenses 2E, 2F, 2G, 2H, 2J, 2K, 2L, 2M, 2N, and the headlight lenses 2P, 2Q, 2R, 2S, 2T, 2U, 2V, 2W, 2X, 2Y, 2Z, 2AA are represented by way of a cross-section having a cross-section face extending orthogonal to the optical axis of the headlight lenses 2P, 2Q, 2R, 2S, 2T, 2U, 2V, 2W, 2X, 2Y, 2Z, 2AA.

It may be provided that the headlight lenses 2E, 2F, 2G, 2H, 2J, 2K, 2L, 2M, 2N, 2P, 2Q, 2R, 2S, 2T, 2U, 2V, 2W, 2X, 2Y, 2Z, 2AA have no structures on their optically operative surfaces. However, it may also be provided that the headlight lenses 2E, 2F, 2G, 2H, 2J, 2K, 2L, 2M, 2N, 2P, 2Q, 2R, 2S, 2T, 2U, 2V, 2W, 2X, 2Y, 2Z, 2AA have surface structures on their optically operative surfaces 4 and 5, resp., as have been represented, by way of example, in FIG. 6, FIG. 7, FIG. 8, FIG. 9, and FIG. 10. It may be provided as well that two or more of the light scattering structures 35E, 35F, 351G, 352G, 35H, 35J, 35K, 35L, 35M, 35N, 35P, 35Q, 35R, 35S, 35T, 35U, 35V, 35W, 35X, 35Y, 35Z, 35AA are combined in one single lens. In this context, it may e.g. be provided that a light scattering structure 35 or 35N is combined with a light scattering structure 35F such that the gradient is set by means of the light scattering structure 35 or 35N and that, by means of the light scattering structure 35F—as has been represented in FIG. 37—, light within a sub-illumination area 181 above the light-dark-borderline 25 is deflected. Herein, the sub-illumination area 181 is separated from the main illumination area 180 positioned below the light-dark-borderline 25. While the major illumination area 180 serves for illuminating the roadway, it is provided that the sub-illumination area 181 enables the illumination of road signs or the like.

The method as has been described with reference to a single lens may also be used for optical structures in the sense of PCT/EP2006/007820.

What is claimed is:

1. Method for manufacturing a headlight lens for a motor vehicle headlight, comprising
   providing a headlight lens comprising a transparent body having an optically operative surface to face a light source and an optically operative surface to face away from the light source;
   measuring the gradient of a light-dark-borderline generated by the edge of a shield and imaged by at least one of the group consisting of the headlight lens and another headlight lens; and
   generating a light scattering structure in the interior within the transparent body depending on the measured gradient.

2. Method as claimed in claim 1, wherein the light scattering structure is generated by means of a laser.

3. Method as claimed in claim 2, wherein the light scattering structure comprises a number of punctiform defects.

4. Method as claimed in claim 3, wherein the punctiform defects are generated in a plane of the transparent body.

5. Method as claimed in claim 3, wherein at least a part of the punctiform defects is generated in a plane of the transparent body.

6. Method as claimed in claim 5, wherein the punctiform defects are generated at random distribution.

7. Method as claimed in claim 5, wherein the plane is aligned orthogonally with respect to an optical axis of the headlight lens.

8. Method as claimed in claim 3, wherein the punctiform defects are generated at random distribution.

9. Method as claimed in claim 2, at least one of the group consisting of
the optically operative surface to face away from the light source and
the optically operative surface to face the light source has a light scattering surface structure.

10. Method as claimed in claim 9, wherein the headlight lens is blank-moulded.

11. Method as claimed in claim 10, wherein an additional light scattering surface structure is embossed into at least one of the group consisting of
the optically operative surface to face away from the light source and
the optically operative surface to face the light source.

12. Method for manufacturing a headlight lens for a motor vehicle headlight; the method comprising:
blank moulding a headlight lens comprising a transparent body having an optically operative surface to face a light source and an optically operative surface to face away from the light source;
measuring the gradient of a light-dark-borderline generated by the edge of a shield and imaged by the headlight lens; and
by means of a laser generating a light scattering structure in a transparent body of another headlight lens depending on the measured gradient.

13. Method as claimed in claim 12, wherein the light scattering structure comprises a number of punctiform defects.

14. Method as claimed in claim 13, wherein at least a part of the punctiform defects is generated in a plane of the transparent body of the another headlight lens.

15. Method as claimed in claim 12, wherein the punctiform defects are generated at random distribution.

16. Method for manufacturing a headlight lens for a motor vehicle headlight; the method comprising:
blank moulding a headlight lens comprising a transparent body having an optically operative surface to face a light source and an optically operative surface to face away from the light source, such that at least one of the group consisting of (a) the optically operative surface to face away from the light source and (b) the optically operative surface to face the light source has a light scattering surface structure;
measuring the gradient of a light-dark-borderline generated by the edge of a shield and imaged by at least one of the group consisting of the headlight lens and another headlight lens; and
by means of a laser generating a light scattering structure in the transparent body depending on the measured gradient.

17. Method as claimed in claim 16, wherein the light scattering structure comprises a number of punctiform defects.

18. Method as claimed in claim 16, wherein the punctiform defects are generated at random distribution.

* * * * *